W. W. WHEELER.
ROTARY ENGINE.
APPLICATION FILED OCT. 3, 1911.

1,060,390.

Patented Apr. 29, 1913.

Witnesses:
S. H. Clarke
Roya Edwards

Inventor
William W. Wheeler.
By Louis M. Schmidt
Atty.

W. W. WHEELER.
ROTARY ENGINE.
APPLICATION FILED OCT. 3, 1911.

1,060,390.

Patented Apr. 29, 1913.
7 SHEETS—SHEET 3.

Witnesses:
S. H. Clarke
Roya Edwards

Inventor
William W. Wheeler
By Louis M. Schmidt
Atty

W. W. WHEELER.
ROTARY ENGINE.
APPLICATION FILED OCT. 3, 1911.

1,060,390. Patented Apr. 29, 1913.
7 SHEETS—SHEET 5.

Inventor
William W. Wheeler.
By Louis M. Schmidt
Atty.

Witnesses:
S. H. Clarke
Bryn Edwards

W. W. WHEELER.
ROTARY ENGINE.
APPLICATION FILED OCT. 3, 1911.

1,060,390.

Patented Apr. 29, 1913.
7 SHEETS—SHEET 6.

W. W. WHEELER.
ROTARY ENGINE.
APPLICATION FILED OCT. 3, 1911.

1,060,390.

Patented Apr. 29, 1913.

Witnesses:
S. H. Clarke
Roger Edwards

Inventor
William W. Wheeler.
By Louis M. Schmidt
Atty.

UNITED STATES PATENT OFFICE.

WILLIAM W. WHEELER, OF MERIDEN, CONNECTICUT.

ROTARY ENGINE.

1,060,390.  Specification of Letters Patent.  Patented Apr. 29, 1913.

Application filed October 3, 1911. Serial No. 652,575.

*To all whom it may concern:*

Be it known that I, WILLIAM W. WHEELER, a citizen of the United States, residing at Meriden, in the county of New Haven and State of Connecticut, have invented certain new and useful Improvements in Rotary Engines, of which the following is a specification.

My invention relates to improvements in rotary engines, and the objects of my improvement are simplicity and economy in construction and convenience and efficiency in use.

In the accompanying drawing.

A is my rotary engine and the same comprises a frame B, a driving pulley C on the shaft F, governor D, gearing E for operating the governor from the driving shaft F, and gearing G for operating the shaft 20 of the main rotary valve H from the driving shaft F. The said frame B comprises a front end plate 21 a rear plate 22 and intermediate thereto a frame body I. The said frame body I is a built up structure, comprising on the front end a high pressure frame body J, an intermediate member K, and a low pressure frame body L, which latter is built up of a plurality of similar frame body elements 23, shown as two in number. Built up as described, the said frame B houses in the front and high pressure end a pair of high pressure rotary piston members M and a high pressure rotary abutment member N in position to coöperate with one another, substantially in a manner disclosed in other of my patents, such as Patents Nos. 935,079, and 945,067.

Figures 11, 12:
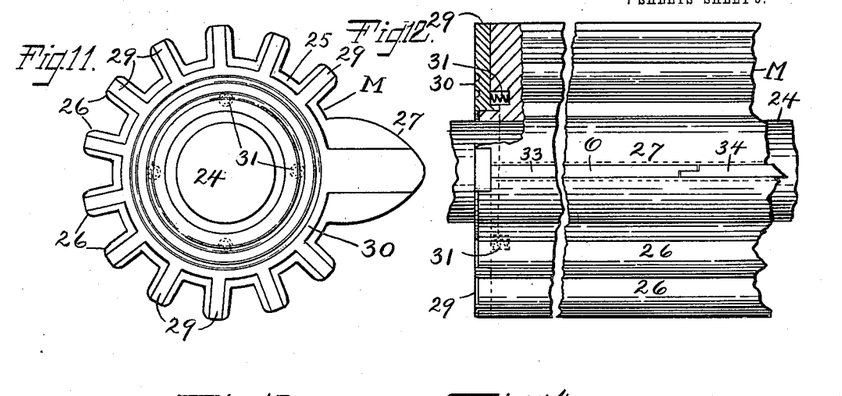
Fig. 11 is an end view of one of the piston members.
Fig. 12 is a side elevation of the same, in part broken away.
Figure 13:
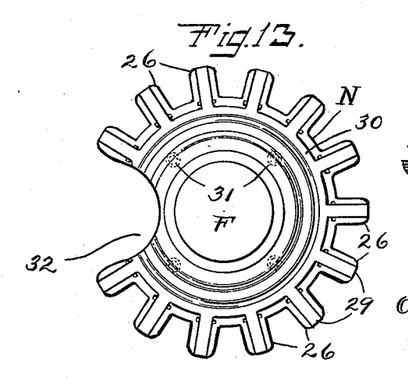
Fig. 13 is a view corresponding to Fig. 11 of the rotary abutment.
Figure 14:
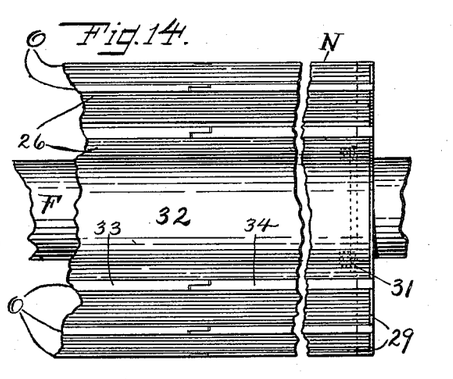
Fig. 14 is a side elevation of the same, in part broken away.

The rotary abutment member N is mounted on the main driving shaft F. The piston members M are mounted on shafts 24. The said rotary piston members M comprise a hub 25 on which are provided teeth comprising a plurality of relatively short teeth 26 and an elongated piston tooth 27, and as described, the piston member M is operatively housed in a cylinder 28, with the outer end of the piston tooth 27 in close proximity to the inclosing inner wall of the cylinder 28. Longitudinal packing strips O of inverted T formation and embedded in suitable grooves in the outer radial ends of the piston tooth 27 close whatever gap there may be between the said tooth and wall to insure fluid tight operation.

At the longitudinal ends, the piston members M are provided with end packing strips 29 which extend radially along the longitudinal ends of the teeth, and which at their inner ends are merged into a ring 30, and thereby united to form a unitary, star-like structure, and which is embedded in suitable grooves in the teeth and hub. The ring 30 is backed by springs 31 which are embedded in the hub and tend to force the said star-like structure outward longitudinally and against the inner end wall of the cylinder 28, and thereby the said star-like structures serve to close the gap between the piston member and the ends of the cylinder and insure fluid tight operation on these parts, and also to provide for the endwise expansion and contraction of the rotary pistons.

The rotary abutment member N comprises teeth 26 that coöperate with the teeth 26 on the piston members M and a recess 32 for receiving the piston tooth 27, and is provided with end packing strips that are united by a ring to form a star-like structure similar generally to that provided for piston members M and also longitudinal packing strips for the radial ends of the teeth. The longitudinal packing strips O are divided about in the middle, being made up of two parts, a left part 33 and a right part 34, in longitudinal alinement, which meet in the form of an overlapping joint having overlapping tongues 35 having faces 36 in abutment in a radial, axial plane, suitable to permit relative sliding of the tongues 35 and the attached parts 33 and 34 longitudinally. The outer ends 37 of the tongues 35 are each separated from the opposed end wall 38 of the part 33 or 34 by a gap 39, there being one such gap 39 on each side of the abutting faces 36.

Figures 15, 16, 17, 18, 19:
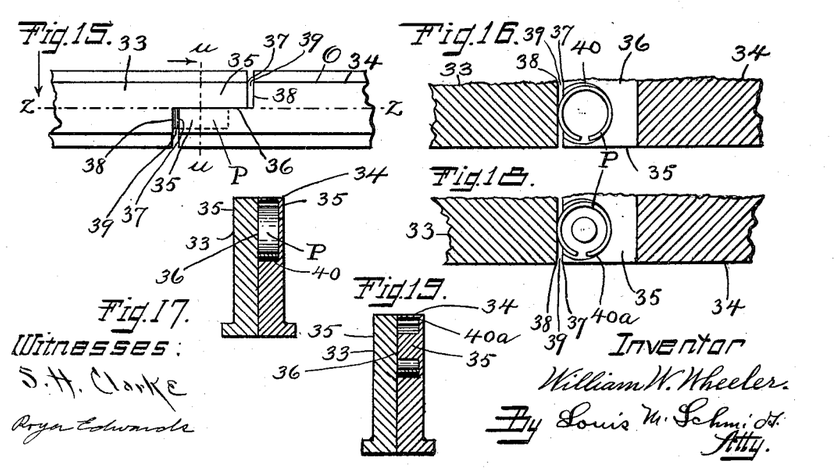
Fig. 15 is a top view of a longitudinal packing strip, in part broken away, and on an enlarged scale.
Fig. 16 is a sectional view on the line $z$ $z$ of Fig. 15.
Fig. 17 is a sectional view on the line $u$ $u$ of Fig. 15.
Figs. 18 and 19 are views similar to Figs. 16 and 17 of a modification of the spring cavity or chamber.

A spring P embedded in one of the tongues 35, shown as that of the right part 34, tends to force the parts 33 and 34 endwise or longitudinally, and as the outer ends thereof are in abutment with the corresponding radial packing strip 29, the spring P tends to keep the said outer ends of the radial packing strips in contact with the inner wall of the inclosing chamber which is the cylinder 28 in the case of the piston member M and the rotary abutment chamber 42, in case of the rotary abutment member. The said spring P is C shaped and the bed 40 therefor is formed in the tongue 35 by counterboring therein from the side of the face 36 with the counterboring tool overlapping the outer end of the same, whereby the said outer end is cut away so as to permit the spring P, embedded in the bed 40, to overhang the tongue 35 and contact with the wall of the bed 40 in the tongue 35 of the part 34 on the one side and the end 38 of the part 33 on the other side. The spring P is made of the same thickness as the depth of the said counter bore or wall 40, and which latter is made to a depth such as to have only a thin bottom wall for the said bed or wall 40, and because of the conditions mentioned, the spring P serves to substantially fill the gap 39 which it crosses, and thereby operates as a dam to obstruct the passage of fluid therethrough. Accordingly, there is one open gap 39 and one substantially closed by the spring P, and as steam leakage past the joint of the parts 33 and 34 would be down one gap 39 radially, across underneath the strip in the space between the same and the bottom of the groove in which the strip lies, and then upward through the other gap 39, the obstruction of one of these gaps 39 by the spring P in the manner described serves to obstruct fluid leakage via the said gaps.

In the modification shown in Figs. 18 and 19 the well 40$^a$ is formed as an annular chamber or wall, cut away at one end, to accommodate the C shaped spring P, there being a central boss of the original tongue 35 that is not cut away.

The low pressure frame body L comprises an elongated structure, which otherwise than in the length, is precisely similar internally in the cylinder and abutment chamber portions to the corresponding portions of the high pressure frame J and houses a pair of rotary piston members Q and a rotary abutment member R, which however are mounted, tandem fashion, on the same shafts 24 and F as the corresponding parts of the high pressure section or end. The low pressure piston members Q are built up of a plurality of units that are similar precisely to those used for the high pressure pistons M, and similarly the low pressure rotary abutment R is built up of a plurality of units similar to those used for the high pressure rotary abutment N. An interconnecting port 41 passing under the high pressure rotary abutment chamber 42 interconnects the pair of high pressure cylinders 28 and a similar port 54, under the low pressure rotary abutment chamber 56 interconnects the low pressure cylinder pair 55.

Symmetrically located above the high pressure rotary abutment chamber 42 there is provided a chamber 43 which serves as a combined valve chamber and steam chest or fluid chest and in which is operatively housed the said rotary valve H, mounted as described on the shaft 20, and having a sector shaped port 44. A fluid supply or cylinder inlet port 45 connects from the said chamber 43 to the right hand high pressure cylinder 28. The said valve H is generally cylindrical and the walls of the chamber 43 are generally separated from the same by an appreciable space to provide fluid space, except for a narrow lip or platform 46 each side of the said port which lip or platform 46 is pierced centrally by the said port 45, and which platform is appreciably narrower than the said port 44. The body of the said valve H is generally in contact with the said platform 46 and generally closes the said port 45, which port, however, is periodically connected with the steam space 43 by the port 44, as the valve H is revolved. Between the steam chest 43 and the high pressure cylinder 28 in port 45 there is provided a governor valve S that operates as a throttle valve, and is controlled normally by the governor D.

The steam chest 47 in the low pressure body L is generally open, except for the shaft 20, which as a convenience in construction, extends through the same, and is connected with the outlet 49 of the left hand high pressure cylinder 28 by the port 48, and to the right hand low pressure cylinder 55 by a port 81 corresponding in location to the said port 45 in the high pressure frame J.

The final discharge port is connected to the left hand low pressure cylinder 55 at a position corresponding to the position of the outlet port 48 of the left hand high pressure cylinder 28 and connects via the discharge header 50 to the discharge outlet 51. The said post 48 serves as a cross-port and as a convenience in construction the said post 48 is provided in a separate part or element of the frame B, designated as the intermediate member K which is a plate-like structure of suitable thickness and of the same size laterally as the flanges 52 of the adjacent high and low pressure frame bodies J and L, and connected thereto by bolts and nuts. Similar flanges 52 are provided at the ends of all of the frame body parts and the end plates at their junctures, one with the other, and which flanges are similarly clamped together by bolts and nuts.

A port 53 extends through the top of the frame J of the high pressure section and leads to the top side of the steam chest 43 and serves as the main fluid supply inlet, and a by-pass port 85 extends laterally through the said frame J to the port 45, preferably at a point between the steam chest 43 and the governor valve S, and the said main supply port and by-pass port are provided with means for being connected to supply piping and suitable hand operated controlling valves substantially as shown and disclosed in the patents referred to above. As described, under normal conditions of operation, motive fluid is admitted through the supply port 53 to the steam chest 43 and thence is admitted to the cylinder inlet port 45 by means of the port 44 in the valve H periodically, during a certain definite part of each revolution of the said valve H. Thence it is admitted through the governor valve S, the quantity being dependent upon the position of the same, through the said cylinder inlet port 45 to the right hand high pressure cylinder 28. At the time that the motive fluid is first admitted as described the right hand high pressure piston tooth 27 is in position immediately in advance of the said inlet port 45 and is moved by the effect of the fluid pressure. During the first part of the movement of a complete revolution of the piston 27 while the port 45 is connected to the steam chest 43, full pressure steam or fluid is admitted to the piston, and during the latter part of a revolution the valve H cuts off the supply and the fluid operates expansively, at first in the right hand cylinder 28, then in succession through the left hand high pressure cylinder 28, the right hand low pressure cylinder 55 and then through the left hand low pressure cylinder 55 to the discharge 51, the pistons uncovering in succession the ports that have been mentioned that lead from the one cylinder to the next in the order named. In order to obtain the best effect from the motive fluid I arrange the right hand low pressure piston on member Q on its shaft in such a position that its piston tooth will be immediately in front of the port 81 leading to the low pressure cylinder 55 from the low pressure steam chest 47 when the left hand high pressure piston tooth 27 uncovers the outlet port 48.

As described, the steam or motive fluid operates on four pistons in succession, and under conditions involving quadruple expansion.

The governor D is a ball governor of the type known as the Pickering governor, and operates to control the governor valve S. The said valve S comprises a plug 57 pierced by a diametral port 58 which when in registration with the port 45 permits of free flow of motive fluid, and when turned at about 90 degrees from the position of registration serves to entirely close the said port 45, and under normal conditions of operation is maintained by the governor D at positions intermediate the two extreme conditions cited.

A valve arm T is secured intermediate its ends to the shaft 57 of the valve S and has two arms extending on each side of the said shaft 57, one of which is laterally directed and provided with a forked end 59 which engages with a pin $u$ that is actuated generally vertically by the governor D, and the other arm 60 is connected at the outer end to a tension spring V that tends to turn the valve S in opposition to the action of the governor D. The said pin $u$ is carried by a collar W that is connected with the free ends of the governor springs 61 and is moved by the same under normal conditions in response to the movements of the governor balls 62. The said collar W is limited in its downward movement by a stop ring or support 63, fixedly secured to the frame I, with which it is in contact under conditions of low speed and on which it rests while shut down, and in which position the valve port 58 is in registration with the port 45, permitting full passage of steam or motive fluid. As described, the said stop ring support 63 through the pin $u$ and arm T serves as a limit for the movement of the arm T and valve S under normal conditions, and as stated, involving full open conditions for the valve S. In case the pin $u$ should become broken or the fork 59 disengaged therewith or other conditions arise that prevent the limitation of the movement of the valve S as described, the spring V operates to turn the said valve S beyond the normal position of registration and to the position across the port 45 thereby shutting off the flow of motive fluid, and causing a shut down.

The shafts for the valves and the piston members and rotary abutment members extend through the end frames 21 and 22, and bearings therefor are provided in the said end frames.

Figure 1:
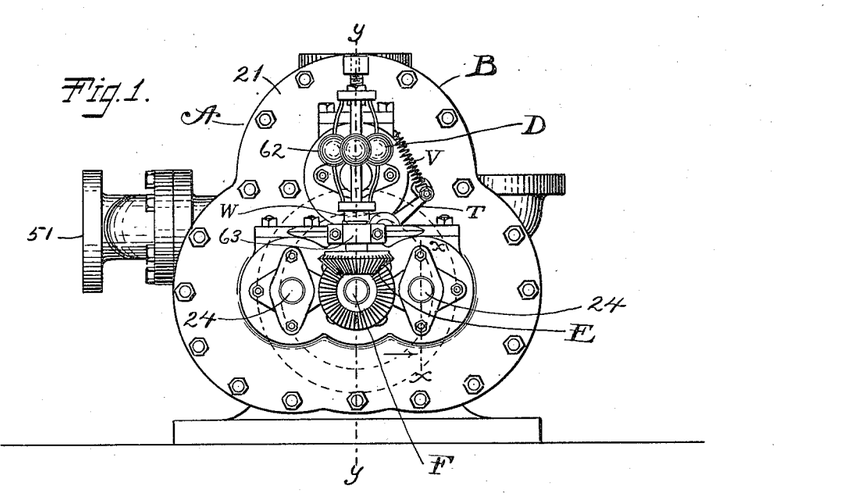
Figure 1 is an elevation of the front end of my rotary engine, the driving pulley being indicated by broken lines.
Figure 2:
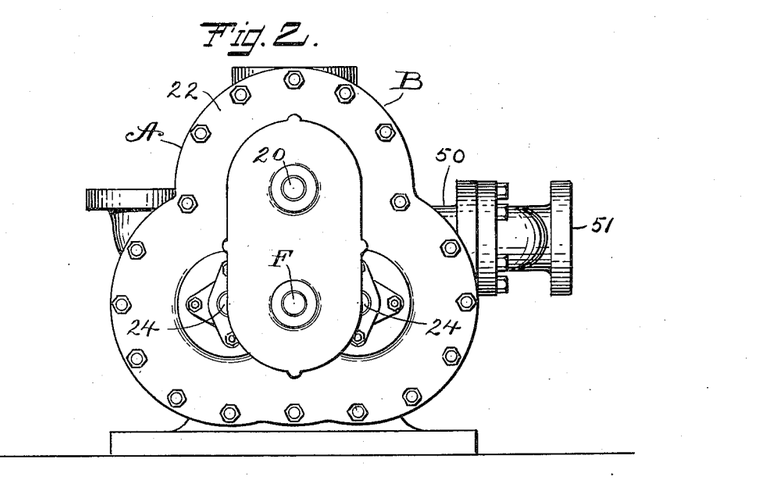
Fig. 2 is a similar view of the rear end of the same.
Figure 3:
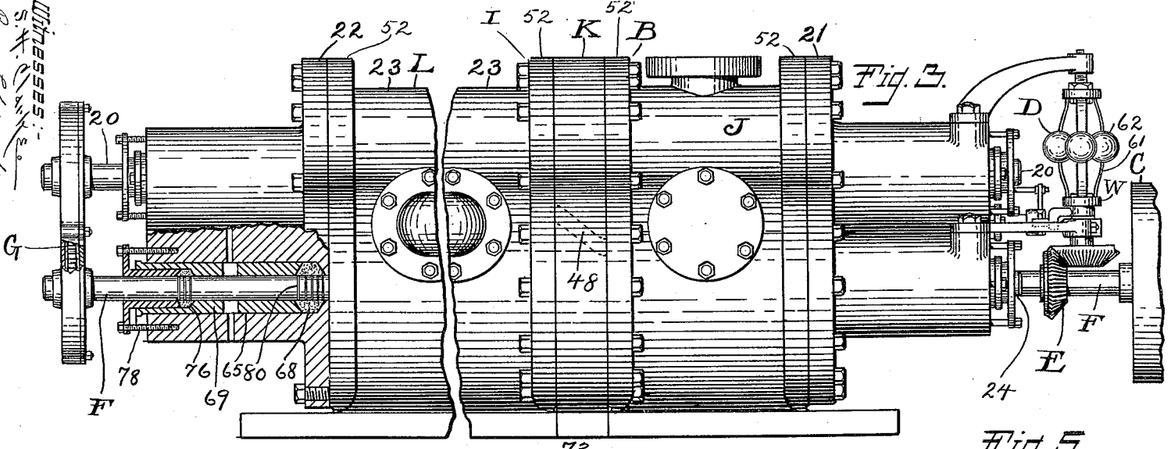
Fig. 3 is a side elevation of the same, in part broken out and part in section.
Figure 4:
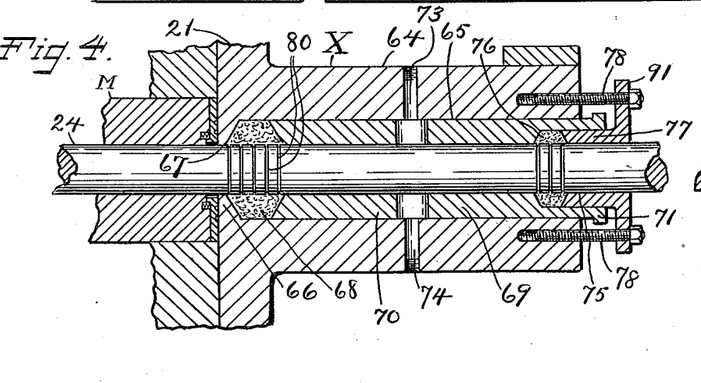
Fig. 4 is a sectional fragmentary view on the line $x$ $x$ of Fig. 1, on an enlarged scale.

In Fig. 4 is shown the construction of the bearing X for the shafts 24 and F for the piston members and for the rotary abutment. As shown, the said bearing X comprises a housing 64 projecting forwardly from the end frame 21 in the form of a hollow sleeve having a cylindrical chamber 65 extending from the front inwardly, of a diameter considerably in excess of the shaft 24 and which chamber is limited at the inner end by a relatively thin wall 66 which serves as a packing seat and which latter is pierced by a hole 67 that is a fit for the shaft 24. In abutment with the said packing seat wall 66 is the packing 68 and outward therefrom is the combined gland and bearing 69. The said gland bearing 69 comprises a sleeve 70 that engages by its inner end the said packing 68, is a fit for the said chamber 65 on the exterior and for the shaft 24 on the interior and is of length such as to extend outward beyond the said housing 64, and at the said outer end merges into the flanged head 71. The said flanged head 71 is provided with means of adjustment and positioning the gland bearing 69 comprising compression screws 72, which screw into the outer end of the housing 64 and engage with the screw heads the said flanged head 71. In order to provide for forced oil feed I provide an oil inlet passage 73 extending through the housing 64 and gland bearing 69 and an oil outlet passage 74, and also a stuffing box at the outer end of the gland bearing 69 comprising the stuffing box chamber 75 in the said outer end, concentric with the shaft 24, packing 76 at the inner end thereof, and a gland 77 bearing on the same and held in position by adjusting screws 78 engaged with a flanged head 91 on the said gland 77 and with the outer end of the said housing 64.

Figure 5:
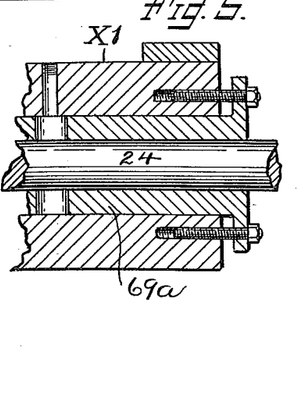
Fig. 5 is a similar view of a modification of the parts shown in Fig. 4.
Figure 6:
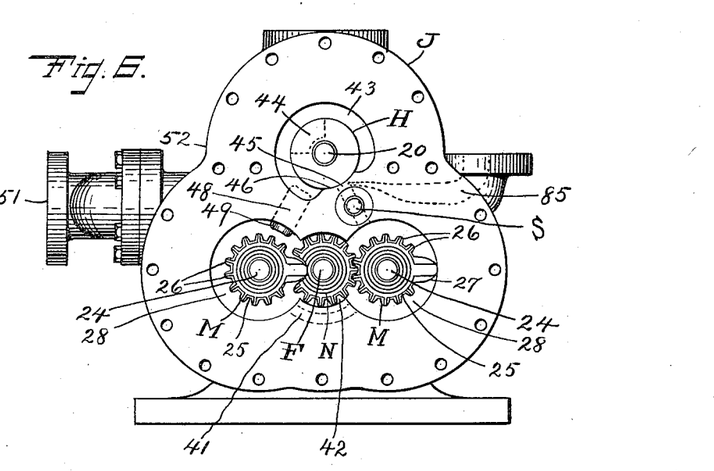
Fig. 6 is a view similar to Fig. 1 and on the same scale, the front end plate being removed.
Figure 7:
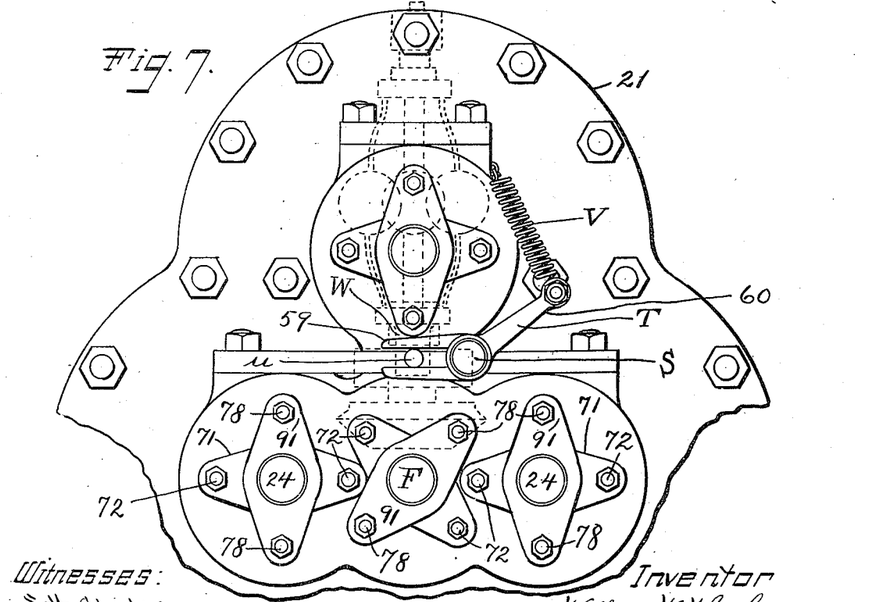
Fig. 7 is a fragmentary view of parts of the governor mechanism, on the same scale as Fig. 4.
Figures 8, 9, 10:
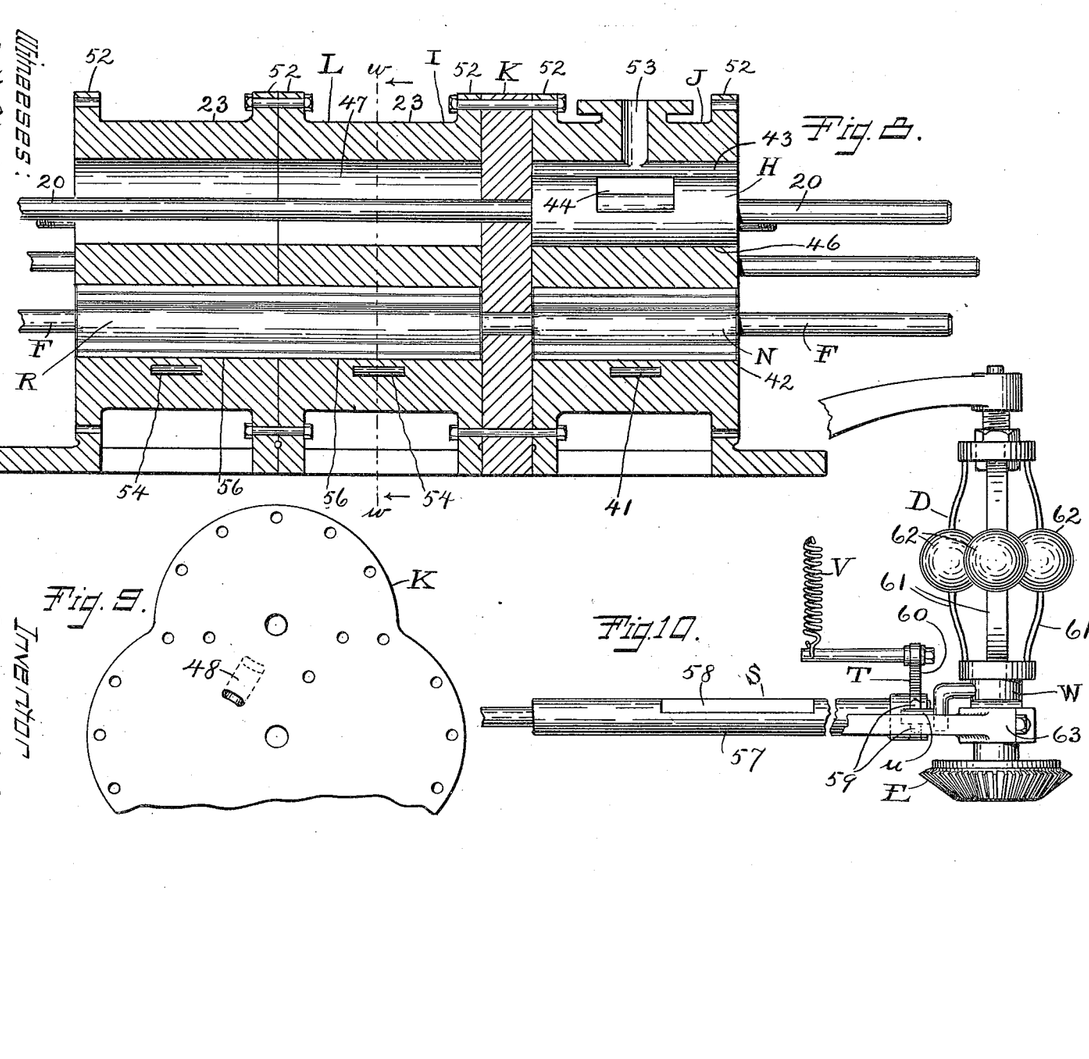
Fig. 8 is a sectional view on the line $v$ $v$ of Fig. 1, and with the end plates removed, on the same scale as Fig. 1.
Fig. 9 is an end view, in part broken away, of the intermediate member.
Fig. 10 is a detached view of the governor similar to that shown in Fig. 3, on an enlarged scale.

In the bearing $X^1$ shown in Fig. 5 for oil cup feed the bearing gland $69^a$ fits the shaft to the outer end, the stuffing box at the outer end being omitted.

The bearing X as described is especially adapted to the construction of the internal parts of my rotary engine as shown and described, comprising internal coacting teeth requiring accuracy of construction and coöperation.

Because of the fact that my moving pistons and abutment operate strictly rotatively and are free from longitudinal or axial movement, I find that I can present barriers to prevent the axial escape of motive fluid along the exterior surface of the shafts 24 and F by providing the shafts as shown in Fig. 4 with a plurality of circular grooves 80 along the portion in contact with the packing 68 and 76 of appreciable depth and which permit the said packing to be embedded therein. By using these packing grooves 80 the effective creepage or seepage distance in the axial direction is increased, whereby I am able to provide a fluid tight joint with less pressure applied to the packing than would be possible with a strictly cylindrical shaft.

Figure 20:
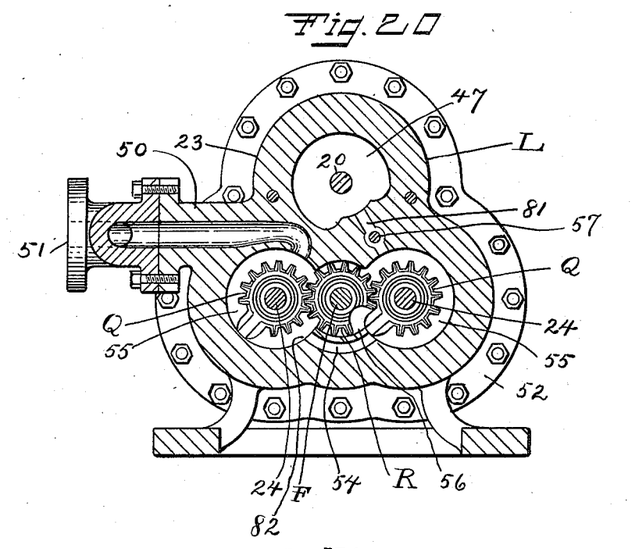
Fig. 20 is a sectional view on the line $w$ $w$ of Fig. 8 and on the same scale.
Figure 21:
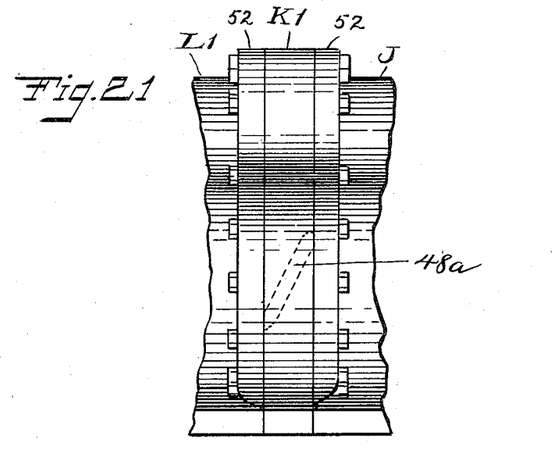
Fig. 21 is a side elevation of a modification of the intermediate member and part of the connected parts, corresponding to Fig. 3.
Figure 22:
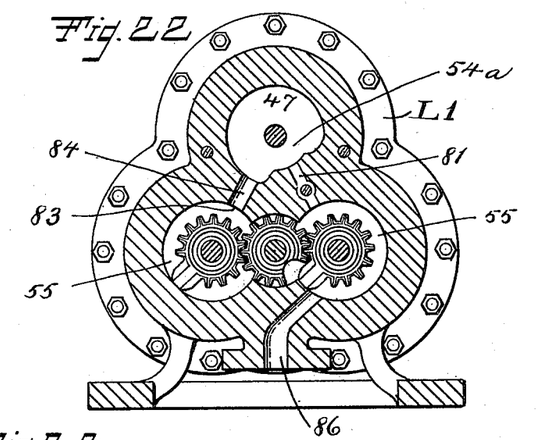
Fig. 22 is a view similar to Fig. 20 of a modification of the low pressure body.
Figure 23:
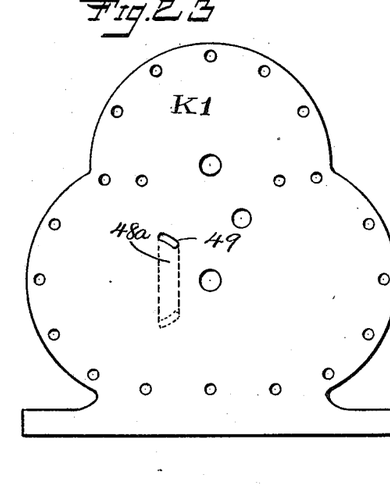
Fig. 23 is an end elevation of the intermediate member shown in Fig. 21.

In the modification shown in Fig. 22 the elements $L^1$ for the low pressure frame receives motive fluid in the left hand low pressure cylinder 55 directly from the left hand high pressure cylinder 28 by way of the port $48^a$ in the modified intermediate member $K^1$ which connects from the usual outlet or discharge point 49 in the said cylinder 28 to a point in the said left hand low pressure cylinder 55 corresponding to the position of the inlet point 82 of the interconnecting port 54 in the construction shown in Fig. 20. In other words, the inlet point is at the same position in both cases, the difference being in the source of the supply that reaches the said left hand low pressure cylinder 55. The discharge port for the said left hand low pressure cylinder is positioned as shown at 83 at the same position in the cylinder as in Fig. 20, but the port 84 that leads therefrom connects to the low pressure steam or fluid chest 47, and the port 81, corresponding to the port 45 in the high pressure end connects the low pressure steam chest 47 with the right hand low pressure cylinder 55. The discharge from the right hand low pressure cylinder 55 is by way of the port 86 to the final outlet or discharge instead of by way of the low pressure interconnecting port 54 to the left hand low pressure cylinder. As described, the port 84, chest 47, and port 81 serve as an interconnecting port $54^a$ between the left hand low pressure cylinder 55 and the right hand cylinder 55.

Figure 24:
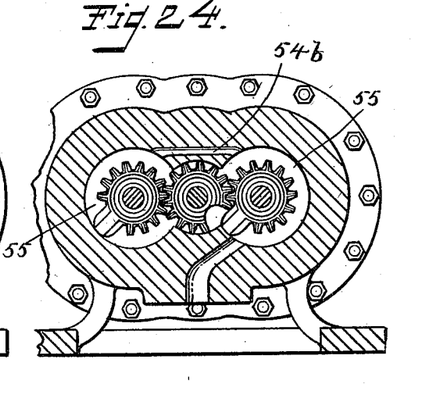
Fig. 24 is a view similar to Figs. 20 and 22 of another modification of the low pressure body.

In the modification shown in Fig. 24 the interconnecting port $54^b$ is direct, leading from the left hand low pressure cylinder 55 to the right hand low pressure cylinder 55, avoiding the use of the fluid chest 47, thereby making a correspondingly lower structure and accordingly deviating appreciably from the frame structure of the high pressure end.

In operation it is possible in some cases to omit the rotary cut-off valve H, allowing full pressure fluid to act on the high pressure pistons directly, and the fluid to act expansively on the low pressure pistons, the high pressure piston of the left hand cylinder operating as a cut off for the low pressure end, the amount of fluid admitted being governed in the usual manner by the governor.

As described, I have provided a rotary engine that is easily constructed, that will act as a compound engine, has efficient means of governing and lubricating, and by delivering the fluid from the left hand high pressure cylinder to the left hand low pressure cylinder I am enabled to effectively balance the load on the two sides of the shaft. Furthermore, the engine as described can be operated without a cut off valve for the high pressure cylinders and pistons, and operate expansively on the low-pressure pistons, thus avoiding the necessity of supplying such a rotary valve and also avoiding the necessity of the by-pass port connected to the main fluid supply, and my engine so arranged is positive in starting and operating, being free from any dead center.

I claim as my invention:—

1. A rotary engine comprising a pair of high pressure cylinders and a pair of low pressure cylinders arranged in tandem relation thereto, and pistons operatively housed therein, an interconnecting port connecting the members of each of the said pairs of cylinders, a cross-port connecting the outlet of the said first pair with the inlet of the second pair, and the said first pair provided with a supply inlet and the second pair with a discharge outlet, whereby motive fluid supplied to the said supply inlet will be operatively delivered to the several pistons consecutively and finally discharged through the said discharge outlet.

2. In a rotary engine comprising a cylinder member having an elongated cylinder structure, the said cylinder structure comprising a plurality of similar elements arranged in series and connected one to the other by means of flanges in abutment and whereby the said flanges serve as reinforcing radial ribs intermediate the ends of the said member.

3. In a rotary engine comprising a steam chest a pair of high pressure cylinders and a pair of low pressure cylinders in tandem relation, pistons operatively housed in the said cylinders, a ball governor operatively connected to the said pistons, also a rotary valve operatively connected thereto, and having means for periodically connecting the said steam chest with the high pressure cylinder supply port, a valve operatively connected to the said governor and located in the said port and serving to throttle the fluid passage way through the said port in response to movements of the said governor.

4. In a rotary engine having as a means of governing in combination a rotary valve operative periodically to connect the cylinder with the fluid supply and a throttle valve in the port leading to the said cylinder, the said throttle valve comprising a cylindrical body having a diametral cross-port, suitable for being turned in alinement and in registration with the said port to permit of free flow of fluid and for being turned at right angles thereto and permit the said body to obstruct the said port, a governor operatively connected to the said throttle valve, the means of connection comprising a lever arm connected to the axis of the said throttle valve, to a spring and normally to the governor, and the spring operative in opposition to the governor, the said spring operative in case of failure of the connection between the said lever and governor to turn the said throttle valve to the closed position.

5. In a rotary engine having a rotative member comprising a central hub provided with radial teeth and operatively mounted in a chamber having end walls adjacent the ends of the said teeth and radial packing strips extending between the said ends of the teeth and end walls, the said packing strips united at their inner ends by an annular ring and forming therewith a unitary star-like structure, and resilient means bearing against the said ring and tending to hold the same against the said end wall.

6. In a rotary engine having a rotative member comprising a central hub provided with radial teeth, and operatively housed in a chamber, radial packing strips located between the ends of the said teeth and the adjacent end of the inclosing wall, means tending to press outward longitudinally the inner ends of the said strips, longitudinal packing strips between the radial outer edges of the said teeth and the adjacent inclosing wall, the said latter strips divided and provided with resilient means tending to drive the two parts away from another longitudinally, the outer ends thereof being in abutment each with a radial packing strip.

7. A compound rotary engine comprising a pair of high pressure cylinders connected by an interconnecting port and a pair of low pressure cylinders connected by an interconnecting port, and a cross port connecting one of the said high pressure cylinders with one of the said low pressure cylinders.

8. In a rotary engine comprising a pair of high pressure cylinders and a pair of low pressure cylinders and having pistons in the said cylinders, a rotary abutment operative with each piston pair and an inter-connecting port connecting each cylinder pair, the said high pressure pistons having means for receiving high pressure motive fluid throughout their active stroke at the full fluid pressure and the said low pressure cylinders having means for receiving the said fluid from the said high pressure cylinders and means for operating the said fluid on the said low pressure pistons expansively.

9. In a rotary engine having a rotative member comprising a central hub and radial teeth, operatively mounted in a housing and longitudinal packing strips embedded in the radial outer ends of the said strip and bearing against the inner wall of the adjacent housing, the said strip divided into two parts about the middle length and provided at the point of division with resilient means tending to longitudinally separate the parts thereof, the said parts having overlapping members at the point of division, one of said members provided with a chamber, a spring generally C shaped, housed in the said chamber, of the same thickness as the depth thereof, tending to open outward and having the ends bearing against the said parts, and serving as the said means.

WILLIAM W. WHEELER.

Witnesses:
SHEFFIELD H. CLARKE,
ROYA EDWARDS.

Copies of this patent may be obtained for five cents each, by addressing the "Commissioner of Patents, Washington, D. C."